Jan. 3, 1967 T. E. BUTZ ETAL 3,295,311
DEAD END AND METHOD OF MAKING THE SAME
Filed Dec. 6, 1965 5 Sheets-Sheet 1

INVENTORS
Tom E. Butz
Seymour N. Schlein
BY J. D. Douglas
their atty

Jan. 3, 1967  T. E. BUTZ ETAL  3,295,311
DEAD END AND METHOD OF MAKING THE SAME
Filed Dec. 6, 1965  5 Sheets-Sheet 2
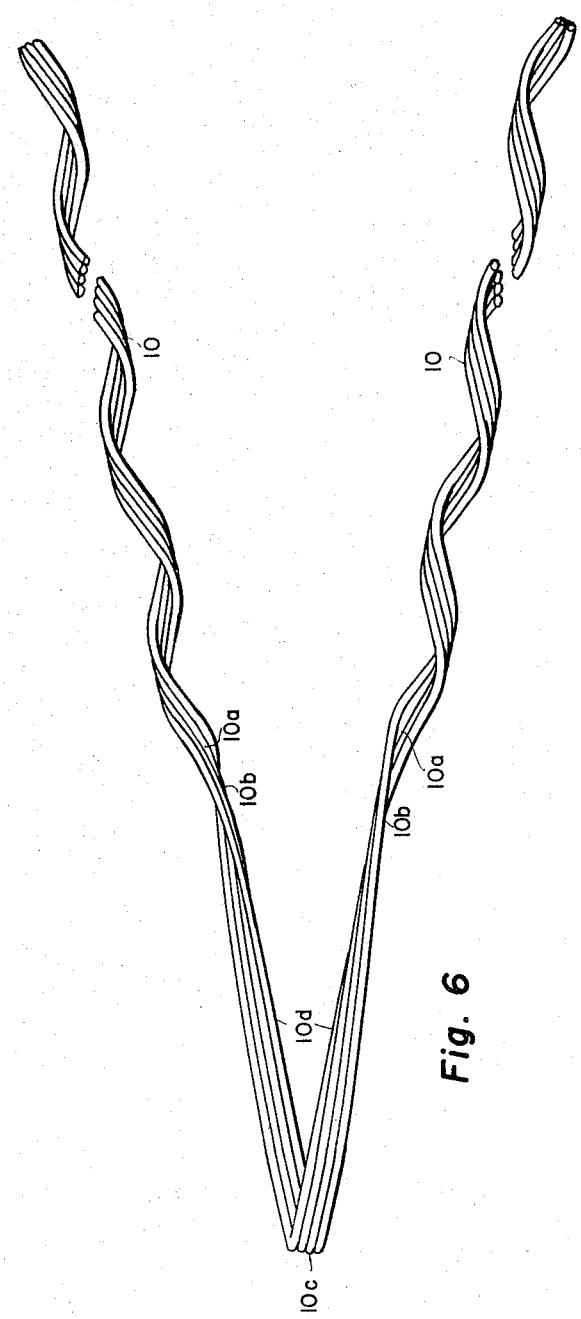
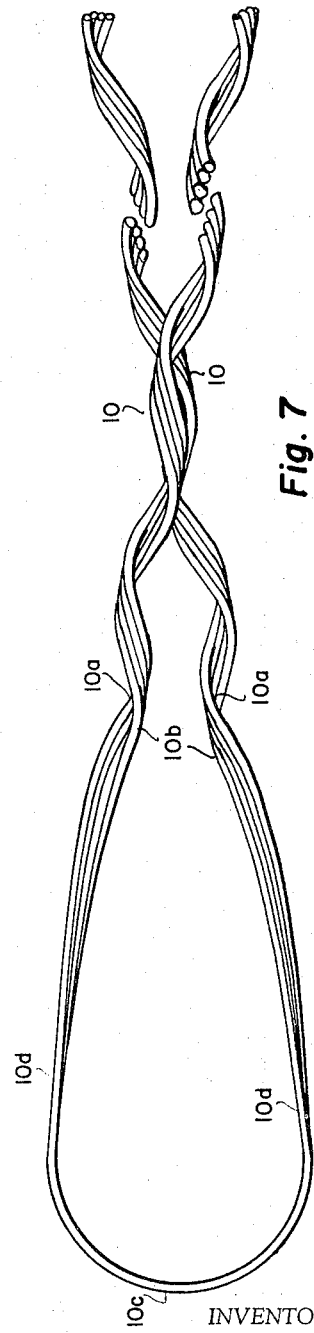
INVENTORS
Tom E. Butz
Seymour N. Schlein
BY
J. D. Douglass
their Atty

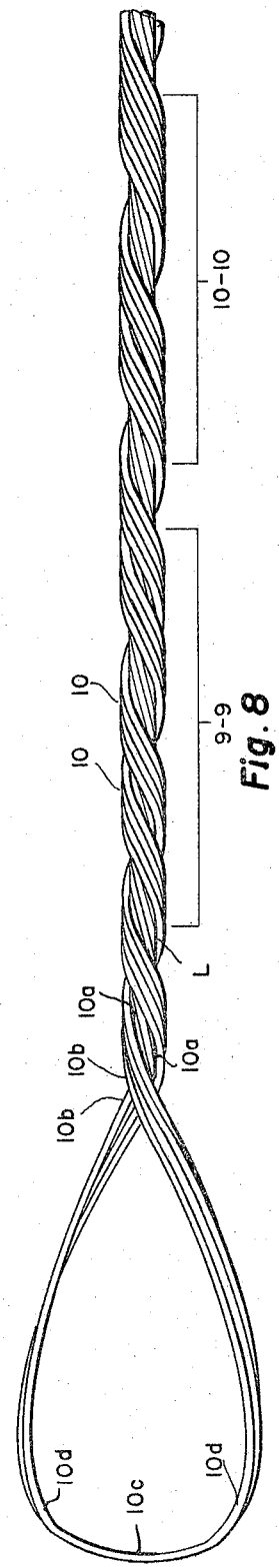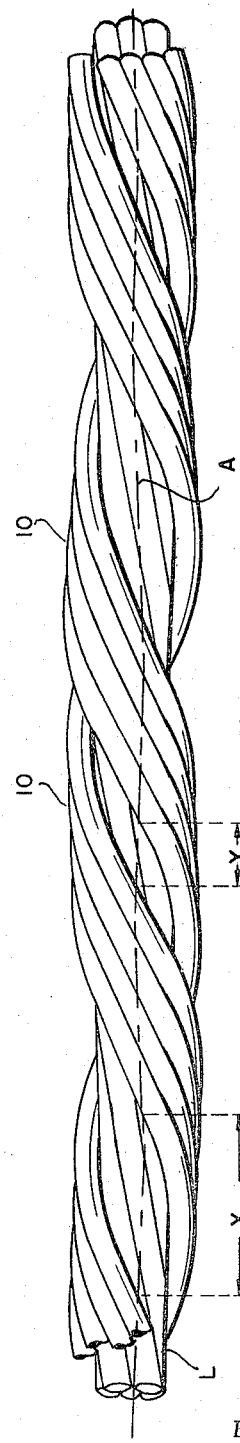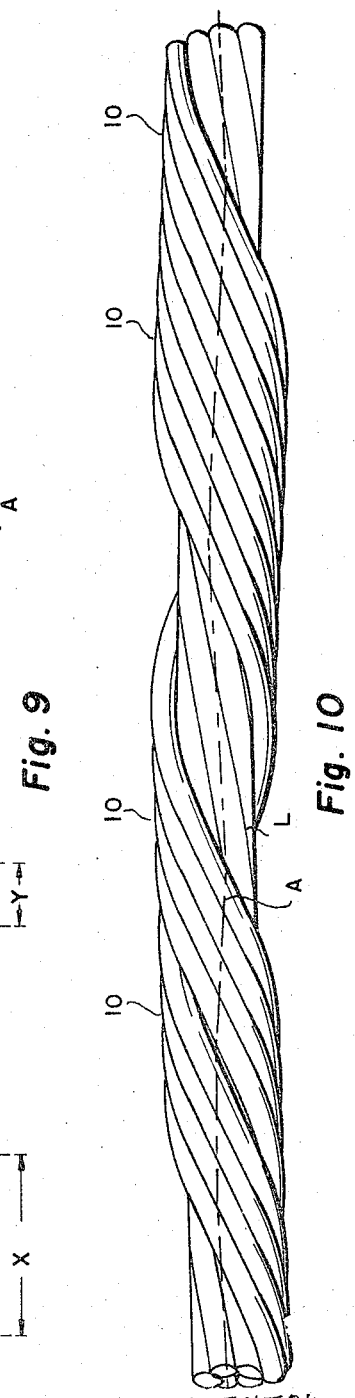

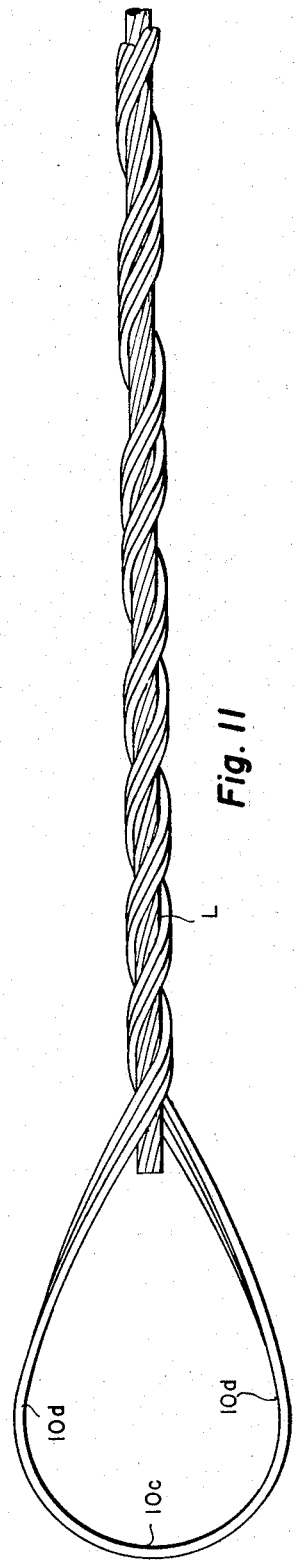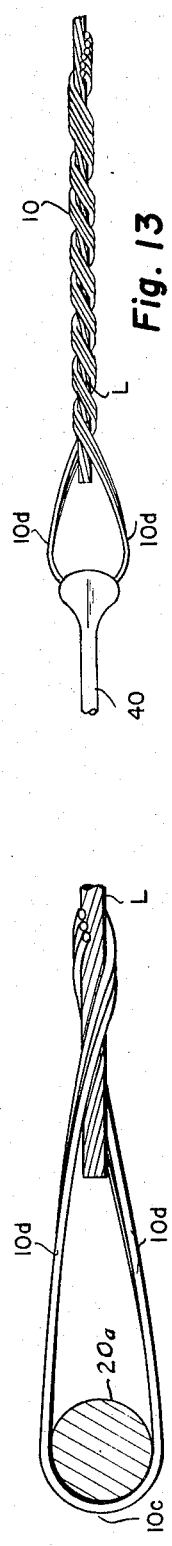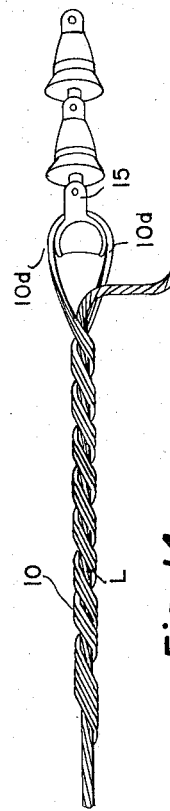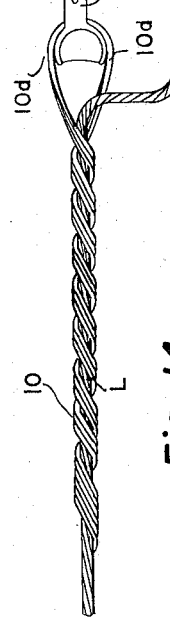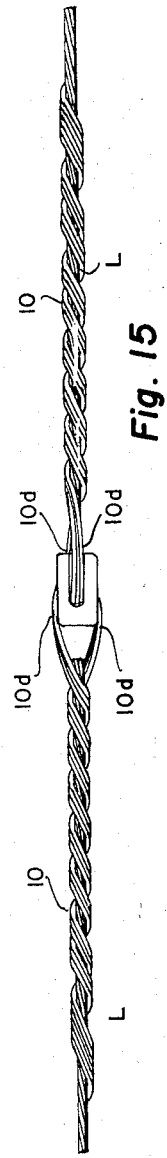

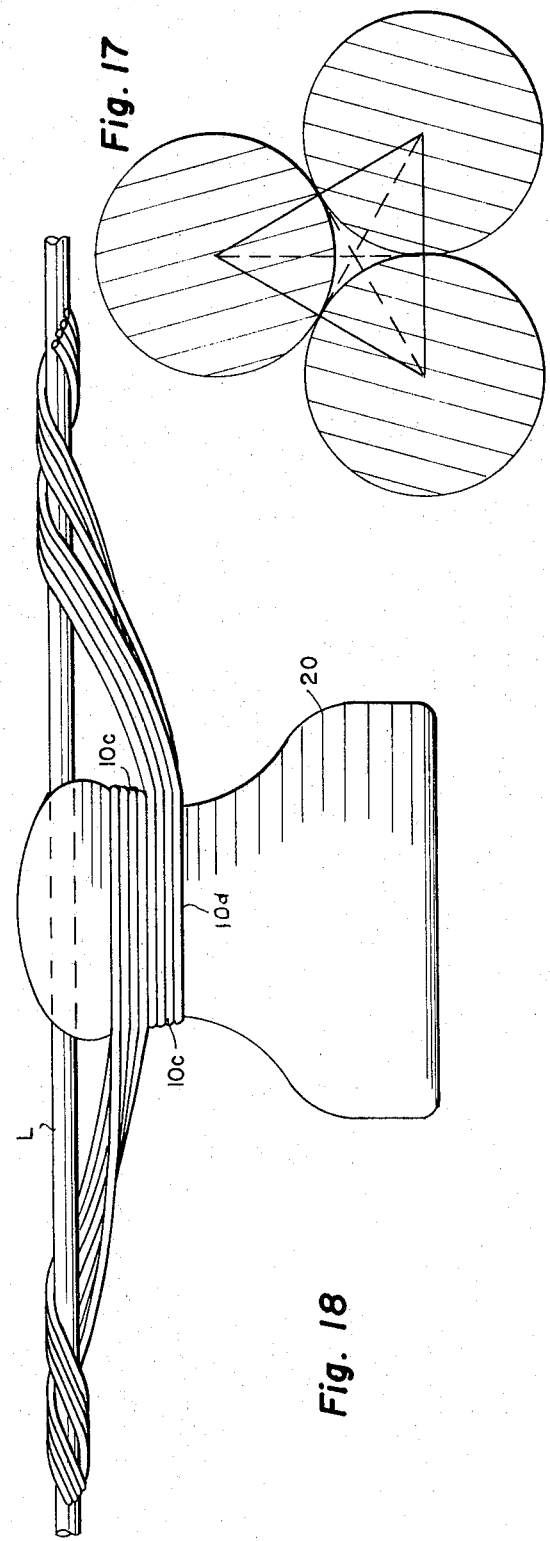

United States Patent Office 3,295,311
Patented Jan. 3, 1967

3,295,311
DEAD END AND METHOD OF MAKING THE SAME
Tom E. Butz, Chagrin Falls, and Seymour N. Schlein, University Heights, Ohio, assignors to The Fanner Manufacturing Company, a Division of Textron Inc., Cleveland, Ohio, a corporation of Rhode Island
Filed Dec. 6, 1965, Ser. No. 511,604
16 Claims. (Cl. 57—145)

This invention relates to new, different and unobvious dead ends and methods of manufacturing the same and, more particularly, to new, different and unobvious dead ends made of preformed helical wires. It is a continuation-in-part of our application Serial No. 394,724, filed September 8, 1964.

Although the principal use of dead ends is for the dead ending of lines, they are also useful as cable suspension means, for use with come-alongs for pulling conductors or lines, and, for service drop grips. The dead ends of this invention are significantly different from and an improvement over those shown in the Selquist Patent 2,202,538 of May 28, 1940, Peterson Patent 2,761,273 of September 4, 1956, and German Patent 1,077,740 of March 17, 1960.

Dead ends are used for gripping cables or strands (e.g., lines) which are used in power transmission and guying of structures. More specifically, they are used to grip an end of a cable for the purpose of transferring the "pull" on the cable to the anchoring structure.

Dead ends are commonly used, for example, to secure a line to a pole, or a guy to a pole or an anchor rod. The line may terminate at the dead end or may proceed from the dead end to a transformer or to a service entrance, when the line is a power line. In the last instance, it is termed a service drop grip.

When the term "line" is used in this specification, it is used in the broad sense and can include, for example, a single wire, a strand made up of a plurality of single wires, and a cable made from a plurality of strands. It also applies to all conductors of electricity and to all lines employed for guying purposes.

Heretofore dead ends for the uses as indicated above were of several general characters, including one type that contemplates preforming or bending wires or rods into preformed helical elements throughout their respective lengths wherein said preformed helical elements had an inside diameter less than that of the line with the pitch of each wire being long enough so that it could be applied to the line from the side without permanent deformation of the helix. A number of such wires were assembled in side-by-side relationship into a group to form a "half-lay" which was then bent into hairpin form to provide a bight, which was placed in the eye of the anchor rod or insulator, and a pair of legs which were wrapped around the line in balanced relation. The legs, being helices of smaller inside diameter than the line, engaged and held the line, and form a "whole-lay" around the line.

A whole-lay is one where the helical wire elements, when wrapped around the line, completely encompass the line to which they are applied. A half-lay of helical wire elements is one where the elements, when wrapped around the line, will cover one-half of the line. For example, a dead end that provides whole-lay coverage when assembled on the line cannot accommodate another wire of the same size in each of its legs and at the same time allow all of the elements of the intertwisted legs to maintain gripping contact with the line. When two legs are assembled on the line and the coverage of the circumference of the line is less than about 80–85 percent, the two legs do not form a whole-lay and each leg may be considered to be less than a half-lay. This definition, of course, applies to practical commercial installations and does not apply to situations in which the diameter of the wire elements in the legs of the dead end are very small (non-conventional) or very large (non-conventional) in relation to the diameter of the line.

The present invention is concerned with dead ends of the general character of those using helically preformed wires.

The preformed dead ends of the prior art were found to have had certain significant shortcomings which the present invention overcomes.

Prior dead ends were ordinarily made from wires or rods, each of which was first formed into a helix throughout its length, then the elements were assembled into a half-lay and bent into hairpin form to provide a bight at one end and a pair of half-lay legs. The bight was then disposed in or on an insulator or the eye of an anchor rod, and the legs wrapped around the line as a whole-lay to thus anchor the line. Such devices had a helical formation in the bight which imparted a spring-like character thereto. More particularly, portions of the bight starting at the crossover point acted as coil springs.

In a modification of this prior dead end, the wires in the bight were provided with a hard closed twist or cabled loop so that the bight would more readily accommodate itself to the hardware with which it was assembled. The bight, however, still had spring-like characteristics.

It was long known to those skilled in the art that the helical formation in the bight resulted in crossed-over wire elements causing notching, nicks, or cutting of the underlying elements which resulted in premature failure. This, however, was overlooked in favor of what was thought to be the advantageous characteristics of the helical formation in the bight.

One recognized disadvantage of a helical formation in the bight is the fact that as tension is exerted on the dead end, unwrapping or peeling of the legs from the line first occurs near the bight end, because the helical wires in the bight do not adequately resist the unwrapping torsion. Because of the unwrapping the holding power is decreased as the tensile load is increased. This disadvantage was compensated for by providing an extra amount of contact length in the legs of the dead end.

Prior art preformed dead ends were intentionally arranged so that the respective legs were in 180° balanced relationship with each other. This balanced relationship was assured by the whole-lay and half-lay design in which the legs were positively positioned with respect to each other. It has been discovered that if the gripping of the legs wrapped about the line is of an engineered unbalanced nature, as in the present invention, wherein the unbalance is accomplished primarily by using dead end grips having legs which do not constitute half-lays and do not together form a "whole-lay," the gripping action of the dead end is greatly improved.

While an unbalanced gripping action might be expected to have some effect upon a pliable line, it is surprising that it has any effect upon a stiff or rigid line, but it does. The extent to which the axis of a stiff or rigid line is laterally distorted or deflected in a sinuous manner by the unbalanced gripping forces is difficult to determine.

Another disadvantage of prior art dead ends was that unless the helical legs were in exactly 180° phase relationship, they could not be readily applied because the legs overlapped and interferred with each other. Even with the phasing exact, trouble frequently occurred during installation, because the lineman disturbed the phase displacement during application and the same undesirable results were realized.

In accordance with the present invention, a dead end is provided which has a "straight" bight instead of a helical formation in the bight, and legs which are less than half-lays instead of the half-lay legs of prior art units. This new and unobvious dead end is significantly different from the prior art dead ends and produces different, unexpected, and improved results.

The invention also contemplates new methods of manufacture of dead ends of the above character which impart improved characteristics to the dead ends, making them stronger and giving them longer life.

Still other advantages of the invention and the description of the invention itself will become more apparent from the following description of illustrated embodiments hereof, which description is illustrated by the accompanying drawings and forms a part of this specification.

In the drawings:

FIG. 6 is a broken plan view of a dead end ready for installation;

FIG. 7 is a broken view of the dead end of FIG. 6, rotated 90°;

FIG. 8 is an elevational view of a dead end installed on a line;

FIG. 9 is an enlarged fragmentary view of a portion of FIG. 8, as indicated by the bracket 9—9, and showing in dashed lines the distortion of the axis of the line when the line is under tension;

FIG. 10 is a similar view taken from the point indicated by the bracket 10—10 of FIG. 8;

FIG. 11 is a view of another dead end on a line;

FIG. 12 is a fragmentary view, on a reduced scale, showing the dead end of FIG. 11 on a small diameter anchoring means;

FIG. 13 is a diagrammatic view showing the dead end of FIG. 11 connecting a line to an anchor rod;

FIG. 14 is a view similar to FIG. 13, showing the dead end of FIG. 11 positioned on an insulator;

FIG. 15 is a view similar to FIGS. 13 and 14, showing a pair of dead ends connecting a pair of lines or guys together by a strain insulator;

FIG. 16 is a diagram showing a cross-section of the non-helical bight portion of a dead end of the invention;

FIG. 17 is a view similar to FIG. 16, showing a prior art structure in a similar location in the bight;

FIG. 18 is an elevational view showing two dead ends securing a line to an insulator;

FIG. 19 is a diagram showing two dead ends used as a line suspension; and

FIG. 20 is a view similar to FIG. 19 of another form of suspension.

Figure 4:
FIG. 4 is an end view of the set of FIG. 3.

Referring now to the drawings, throughout which like parts are designated by like reference characters, and more particularly to the method of manufacture, the first step comprises the formation of straight individual wire into a preformed helical element. This may be done in many ways but preferably is done by taking the wire from a reel, preliminarily straightening the wire in a two-plane straightener, subjecting it to a stress removing device, and then bending it into a helix. A device of this general character is illustrated in the Schane Patent 2,588,663 of March 11, 1952. The helically bent wire is then severed into preformed helical elements of the desired lengths. The ends of the elements may then be chamfered to eliminate any sharp edges. Further stress relief in the wire elements may be produced by baking or light annealing.

Figure 2:
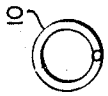
FIG. 2 is an end view thereof.
Figure 1:
FIG. 1 is a broken side elevational view of a preformed helical element made from a wire or rod.

The helix thus formed is an open helix of a hard drawn wire, such that it may be applied to a line from its side, without permanent deformation of the helix. Preferably, the pitch length or the axial distance of one complete revolution of the preformed helical element is less than that of the strand or cable and in the same direction as that of the strand or cable. Such a preformed element 10 is illustrated in FIGS. 1 and 2.

Figure 3:
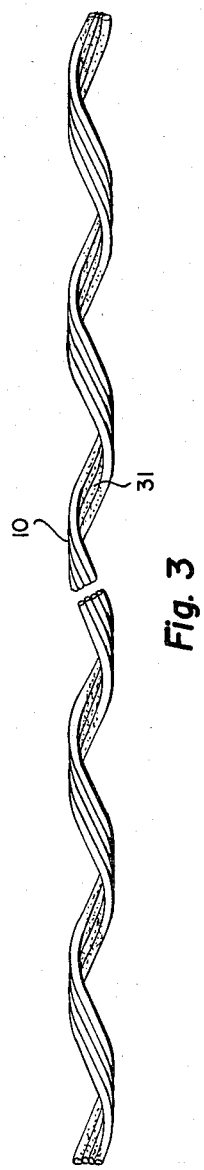
FIG. 3 is a broken view of several elements formed into a set which is less than a half-lay, this being another stage in preparation of the dead end.

Subsequently the elements are cleaned and then assembled into sets of wire elements, as shown in FIGS. 3 and 4. In this step the wire elements are assembled together in side-by-side relation by an endwise threading operation. This assembly is illustrated in FIG. 3. The elements so threaded together or aligned have a common longitudinal axis 11—11 (FIG. 3). The result is a set of less than a half-lay of wire elements in the form of a helical ribbon.

The wire elements so assembled are then sprayed with an adhesive 30, FIG. 16, which performs the function of holding or laminating them together. After the adhesive has set, a suitable abrasive, such as aluminum oxide 31, may be dusted on the interior surface of the helix, FIGS. 3 and 5, to enhance the subsequent gripping action on the line. It is preferred that the abrasive be confined to those portions which will form the legs and contact the line. While the number of wire elements in a set may vary, such a set usually comprises from three to five elements.

Figure 5:
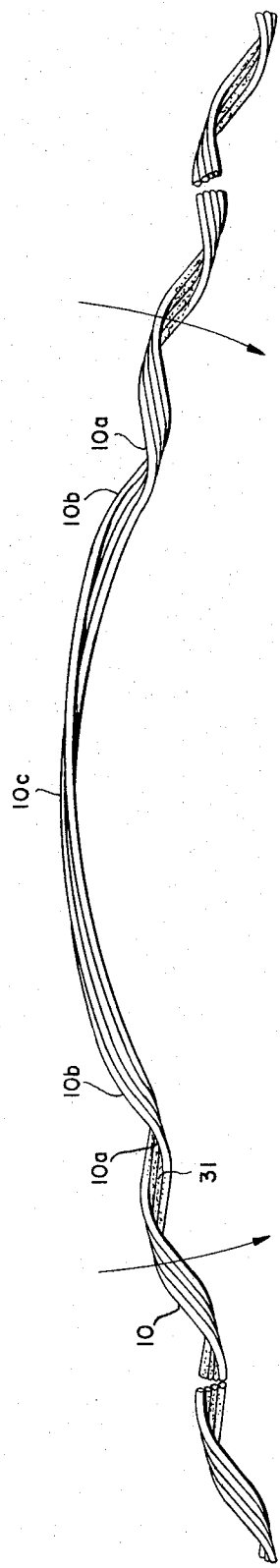
FIG. 5 is a broken view of the elements of FIG. 3, in another, later stage of preparation.

The next step is to remove the helical formation from that part of the wire elements which is to become the bight to form the structure of FIG. 5. This is done by engaging the set of wires at two intermediate places 10a spaced apart to generally define the length of the bight portion, and twisting the set between these points in a direction opposite to that of the helix to unwind the same. Simultaneously tension is exerted between the two intermediate places 10a at which the set is gripped, commencing with a low tensile force and increasing to a higher tensile force as the set is unwound. The twisting of the elements to unbend them is such as to exceed the torsional elastic limits of the elements, with the result that, when released, the helical form of the bight portion is removed and the elements in this portion become straightened or non-helical. The amount of tension required will vary with the size and character of the set. As an example, a set could start at a tension of 30 lbs. of force and end at 2000 lbs. of force, which should be within the elastic limits of the elements within the set so that the elements do not shrink in diameter. A unit so formed is shown in FIG. 5.

The set is gripped at the points 10a and the twisting is such that the straightening occurs between the points 10b with the points 10a approximately in phase with each other, thus leaving the straightened portion with the greatest amount of bend adjacent the parts 10a. It will also be noted that the set still has what may be termed some inside curvature. We have found that it is difficult and impractical to straighten out the set completely. That is, although the wires are generally parallel, their axes are in a slightly curved line, transversely of the elements, the curvature of which is greatest at 10b and gradually but significantly diminishes from 10a to 10c (FIG. 5).

A machine which will provide for the twisting and simultaneous tensioning of the wire is illustrated in Patent 3,151,437, although other types of apparatus may be used.

In the next step, the structure is bent in the direction of the arrows (FIG. 5) to the shape shown in FIGS. 6 and 7. At this stage of manufacture the straight bight is formed substantially of straight, non-helical wires.

The preceding operations, and particularly the bending, the twisting and the simultaneous application of tension to unbend that portion that provides the straight bight, provides a form of "work-hardening" in the bight. This twisting also applies torsional forces to the center portion of each wire element which, when the dead end is assembled on a line, we believe acts to resist peeling or unwrapping of the legs of the dead end adjacent the bight. In other words, we believe that the twisting operation imparts latent or initial torsion to the unit which resists and acts oppositely to the torsional forces developed as load is applied to the line.

The apex of the bight shown in FIGS. 6 and 7 and the parts extending laterally therefrom to approximately the points 10d, being the support engaging portions, have now lost the transverse curvature and the elements in this portion now have their axes parallel and falling on a substantially straight line through their centers.

In its preferred form, the bending is such that the opposite legs end parts of the bight at 10b, because of the bending into a dead end, assume a position where there is a slight phase displacement of the helices in one leg relative to the other leg linearly of the device. Therefore, the points 10a–10b on one side (the far side in FIG. 6) merge into the helical leg longitudinally ahead of the other side and where the points merge with the helical leg the spacing of the legs from each other longitudinally when applied to the line is very close. This makes the start of the helix in one leg ahead of the helix in the other leg. It will be appreciated that although the device is described as being with the revolution in winding clockwise, it would also be effective if the revolution was counter-clockwise.

When the wire elements of FIG. 5 are bent to provide the structure shown in FIGS. 6 and 7, it is preferred that the bight and legs be bent so there is a divergence of the bight and leg portions which is best shown in the drawings (FIG. 6) as being approximately 20° but which may vary. It will be noted that this divergence is in a direction such that the legs must be crossed over each other when they are applied to the line. This causes a distortion in the bight such that the first convolutions in the opposite legs engage the line and facilitates the installation of the remainder of the legs around the line.

As shown in FIG. 7, which is a view at 90° to FIG. 6, the legs cross over each other in spaced relation to each other. The exact place where they cross over depends upon the amount of bending of the elements to form the bight. There could be a divergence of the legs as viewed, if desired. This may be the form of the device as it is shipped to the customer.

The gripping points 10a are selected so that after the dead end is assembled on the line, there is no coil spring formation in the bight beginning at the cross-over point. By way of illustration, reference is made to FIG. 11 in which there is no coil spring formation in the bight. There is, however, prior to assembly on the line approximately one-half revolution of the set throughout the bight. As assembled on the line and viewed from a point on the line, the wire elements in the bight are straight and parallel and together with the line lie in a common general plane. They are bent at their junction with the legs of the dead end on the line only enough to bring about their arrangement in the same general plane as the line.

In one manner of installation of the device, the user attaches a "come-along" between the anchor rod, FIG. 13, and the line L, then threads one of the legs through the eye of the anchor rod 40 until the straight bight engages in the eye and wraps first one leg around the line L and crosses the other leg over the first leg and wraps it around the line (FIG. 8). The line illustrated in FIG. 8 may be either a single solid rod or a strand made of a plurality of wires which are usually three, seven or more. Here the method of application may be such that both legs could be wrapped around the line at the same time. In either event, when both legs are finally around the line, the "come-along" is released and the line is secured. The tension on separate lines may be made more uniform because there is substantially no resiliency in the bight. Obviously the device may be installed on lines or guys which have no tension thereon by simply wrapping the legs around the line.

When applied on the line, the two less than half-lay legs of the dead end of the present invention form an engineered gap or space, as shown in FIG. 8, which permits faster, easier and more foolproof installation than dead ends of the prior art.

An additional advantage of the straight bight configuration resides in the fact that the wire elements which extend through the eye of the anchor rod or eye of the insulator, lie beside each other and each bear against the insulator, thus the strain upon the bight is shared equally among all the elements. There is no element passing over another element and placing pressure on the under element to cause the under element to be dented and weakened. Inasmuch as all of the non-helical wire elements at 10c engage and conform to the contour of the supports, there is greater electrical contact with the eye of the support, reducing the electrical resistance which may, when it is an anchor rod, be grounded.

In prior art devices, the helical elements of the legs are in 180° balanced phase relationship when applied to the line, whereas a result of the engineered gaps of the instant invention, the helical elements of the legs are in usage out-of-phase (unbalanced) after application to the line even though the legs could be initially installed in 180° balanced phase relationship. FIG. 9 illustrates the position the partially less than half-lay legs will take when the phase difference is more or less than 180°. It will be seen in that figure that the gap or distance X between wrappings is greater than the gap or distance Y. In FIG. 10, portions of the legs of the dead end lie contiguous to each other, whereby eight wires are adjacent each other and there is a visible gap and unbalanced phase relationship.

One of the advantages of the present invention is that the legs are in or assume an unbalanced relationship and when tension is exerted on the dead end and line, the dead end legs exert unbalanced forces on the line which tends to distort the line, and the axis A of FIGS. 9 and 10 assumes a sinuous line form where it is gripped by the dead end, thereby enhancing the gripping power of the dead end. In addition, no matter how much tension is exerted, up to the breaking point of the wire element, this desirable distortion of the line increases. Still further, the dead end does not slip on the line because of the decrease in size of the line due to the tension, since the legs together form a partial lay on the line and can contract with changes in line size.

It will be apparent that an even greater unbalanced force on the line may be achieved by a reduction in the number of wires or rods which are used to make up a dead end. This provides a substantial gap between adjacent wrapping of the legs on the line. A dead end with three wires is illustrated in FIG. 11. Here again, the changes in phase of the helices are shown as being progressive although they could be the same from one end to the other. Another advantage of a lesser number of wires is the fact the wires may be of larger diameter. This increases the ease of application because the ends of the wires do not have to be split to obviate the wires folding under each other. With the smaller wires it was customary to split the wires apart at the ends because otherwise there was a tendency for the wires to fold under each other. With the larger wires the added stiffness eliminates this "folding under."

An additional advantage resides in the fact that by using a partial layer a larger wire size may be used for the preformed helical elements. The larger wire size provides a larger cross-section of metal relative to the surface area of the wire, decreasing the corrosion rate, and, as pointed out, is easier to apply and remove.

It was previously mentioned that the device of the instant invention is particularly resistant to "peeling." Peeling is the unwrapping of preformed helical elements in the legs adjacent the bight.

The present straight bight formation, unlike a helical bight configuration, is highly resistant to torsional twisting in the bight portion of the grip. When the wires in the bight are aligned with each other, as shown in the figures of the drawings, excluding FIG. 17, and illustrated diagrammatically in FIG. 16, the Polar Moment of Inertia for the embodiments shown is about 73% greater than when the wires are not aligned and take the conformation of the prior art, as shown diagrammatically in FIG. 17. The flat configuration is much more resistant to twisting or torsion than the triangular one and this is reflected in resistance to peeling. The result is that the so-called peeling is greatly resisted by the improved structure. The non-peeling effect is enhanced by the unbalanced effects of the legs and is realized because of the partial lay.

Another advantage of the straight bight resides in the fact the wires in the bight may bend more readily and thus readily conform to the support for a greater bearing distance. This is illustrated in FIGS. 11 and 12. The bight in FIG. 11 is shown in the position where it would be as applied to a large diameter support and in FIG. 12 to a support 20a which may be as small as ⅝" diameter. This also illustrates the fact that one size of bight may be used to connect effectively to several different sizes of supports. The bending to the smaller size of support is facilitated by the straight bight which is less stiff than the helical bight.

FIG. 13 shows diagrammatically how the dead end may be used to secure the line to an anchor rod 40.

FIG. 14 is a view similar to FIG. 13, showing a line terminated by a dead end at a pair of insulators which are attached to some form of a support, not shown, the dead end being attached to the saddle 15.

FIG. 15 is a similar view showing a pair of dead ends employed to connect a pair of guy wires or the like together through the medium of a strain insulator.

In FIG. 18 a pair of dead ends are shown tying a line to an insulator. In this instance, the bight of one of the dead ends is placed around the neck of insulator 20 with the legs being wrapped around the line in the same manner as for a dead end. Then another dead end is used with the bight placed above the other bight on the neck of the insulator and the legs wrapped around the line extending in the other direction. Due to the lack of resiliency of the bight 10c–10d there is less movement of the line in the insulator groove. Should one side of the line break, the other side is prevented from falling, due to the improved gripping power. Should the line break at the insulator, both sides of the line will be held by the two separate dead ends.

In FIG. 19 there has been diagrammatically illustrated a suspension system for a line. In this system the supports consists of hanger 38 which branches at 37 with a sheave or insulator 32 being located at the end of each branch. A dead end is used at each sheave or insulator, the bight of each dead end being trained over or through the sheave or insulator while legs 10 are wrapped around the line, in much the same manner as in FIG. 15.

In FIG. 20 the hanger 38 supports a single sheave or insulator 39 and the bights of both dead ends are disposed around the sheave or insulator with the legs extending in opposite directions around the line.

Dead ends of the present invention for various sizes of line have been tested against dead ends made according to FIG. 12 of Patent 2,761,273 and for each sized dead end a gain in strength and performance of the new form of dead end was realized.

Examples of some of the dimensions for four typical dead ends of this invention are shown in the chart below.

In the chart below, at the top, "A" to "D" inclusive are specific examples of some of the different sizes of strands or conductors for which certain dead ends were designed. In the specification, these have been referred to mostly as "lines" or "guys." Obviously the number of examples has been limited and there is no limitation as to the actual size of strands that could be dead ended by the device of the present invention. In the left-hand column is found the caption "Strand or conductor diameter" at A, B, C and D. These diameters, shown for illustration purposes, range from .327 to .564 inch. Opposite the next lower caption is found the size of wire used in the dead end, which was found to be highly satisfactory for the particular size of line indicated. It is pointed out that these are merely examples of certain sizes that have been "engineered" for efficient operation and that actually these sizes could vary widely and still provide a dead end that is superior and unobviously different from those of the prior art.

The caption "I.D./O.D." refers to the ratio between the inside diameter of the dead end preformed helical element and the outside diameter of the conductor. It will be noted that since the preformed helical wire element of the dead end has an inside diameter smaller than the outside diameter of the conductor, that this ratio is between .782 and .790.

"Pitch length" is merely the axial distance of one complete revolution of a preformed helical element.

"Application angle" is the angle relative to the axis of the strand or conductor made by the center line of the helical wire where it crosses the axis of the conductor.

"Theoretical grip wires for 100% coverage" is the number of wires required in a dead end to provide complete coverage.

Under the caption "Actual number of grip wires used" there are three wires in each leg, making a total of 6 wires for device "A"; "B" and "C" each have four wires in each leg, making a total of 8; and "D" has five wires in each leg, making a total of 10.

Below this the final caption "Percent coverage of strand or conductor" indicates the percentage of the strand that is actually covered when both legs are in place. This coverage ranges from 54% for strand "C" to 77% for strand "D," and is exemplary of the desired "partial-lay" (less than whole-lay) coverage of this invention.

Chart

|  | A | B | C | D |
|---|---|---|---|---|
| Strand or conductor diameter, in | 0.327 | 0.356 | 0.450 | 0.564 |
| Size of individual wires in grip, in | 0.128 | 0.121 | 0.102 | 0.162 |
| I.D./O.D. Ratio | 0.786 | 0.790 | 0.783 | 0.782 |
| Pitch length, in | 2.80 | 3.25 | 3.03 | 5.40 |
| Application angle, deg | 27.1 | 24.8 | 29.8 | 22.9 |
| Theoretical grip wires used for 100% coverage | 9.95 | 11.25 | 14.8 | 13.0 |
| Actual number of wires | 3×2=6 | 4×2=8 | 4×2=8 | 5×2=10 |
| Percent Coverage of strand or conductor | 60.3 | 71.2 | 54 | 77 |

Dead ends of the present invention have uses and applications for other than electrical utility purposes. For example, these dead ends are applied to fiberglass rods or lines used to guy communication antenna systems. In such systems, metal cables must be avoided because they constitute extraneous metal which interferes with transmission and reception. Prior art, helically preformed dead ends with helical bights, apply harmful torsion and cause harmful peeling with the result that they have not been used satisfactorily for this purpose.

The various embodiments of the invention as shown in the drawings are for the purpose of illustrating the invention. The length of the legs, the size of the bight and the size and number of the wires or rods used may vary from the particular embodiments illustrated.

Various changes and modifications of the invention can be made and, to the extent that such variations incorporate the spirit of this invention, they are intended to be included within the scope of the appended claims.

We claim:

1. Means for holding a line to a support, said means being characterized in that it has resistance to peeling and slippage when applied to said line, said means comprising:
a plurality of resilient elements;

said elements each having helically preformed end portions and an intermediate substantially straight portion joining said helically preformed end portions;

each of said elements of said helically preformed end portions substantially conforming as to pitch length and internal diameter;

said elements positioned in side-by-side relationship with one another to form a group;

said group of elements being bent within said intermediate straight portion to form a substantially straight bight section being free of a complete helical revolution;

legs extending from the respective ends of said straight bight section;

each of said legs comprising said helically preformed portions of said elements; and said elements in said group being limited in number to provide upon the intertwisting of both of said legs about said line more than half lay but less than full lay coverage of said line.

2. Means in accordance with claim 1 further including, in combination, a line about which said legs are intertwisted.

3. A dead end grip for gripping a line and holding it to anchoring structure, said grip comprising a plurality of lengths of elements of similar size in side-by-side relationship, said elements having an intermediate straight bight portion for engagement with anchoring structure, an open helically preformed less than half-lay leg for gripping engagement with a line extending from each of the ends of said bight portion, each of said legs having a smaller inside diameter than the line gripped thereby, said legs, when intertwisted about the line, providing a less than whole lay gripping portion that covers more than 50% and less than 85% of the circumference of the line within said gripping portion and said gripping portion can accommodate at least one other element of the same size and at the same time allow all of the elements in the intertwisted legs to maintain gripping contact with the line.

4. A dead end grip in accordance with claim 3 further including, in combination, a line about which said legs are intertwisted.

5. A dead end grip in accordance with claim 3 having at least three of said elements.

6. A dead end grip for gripping a line and holding it to anchoring structure, said grip comprising a plurality of lengths of resilient metal elements of similar size forming a set of elements in side-by-side relationship, said set having an intermediate straight bight portion for engagement with anchoring structure, said intermediate portion being twisted under tension beyond the torsional elastic limit of said elements to provide a straight bight portion subsequent to helically preforming said elements throughout their respective lengths, an open helically preformed less than half-lay leg for gripping engagement with a line extending from each of the ends of said bight portion, said legs, when intertwisted about the line, providing a less than whole lay gripping portion that covers more than 50% and less than 85% of the circumference of the line within said gripping portion and said gripping portion can accommodate at least one other element of the same size and at the same time allow all of the elements in the intertwisted legs to maintain gripping contact with the line.

7. A dead end grip in accordance with claim 6 wherein each of said legs has a smaller inside diameter than the line gripped thereby.

8. A dead end grip in accordance with claim 7 further including, in combination, a line about which said legs are intertwisted.

9. A combination of a line and a dead end grip for gripping said line and holding it to anchoring structure, said structure comprising:

a line;

a grip having a plurality of lengths of resilient metal elements in side-by-side relationship, said elements having an intermediate work-hardened straight bight portion for engagement with anchoring structure, an open helically preformed less than half-lay leg extending from each of the ends of said bight portion, said legs being intertwisted about said line to provide a less than whole lay gripping portion that covers more than 50% and less than 85% of the circumference of said line within said gripping portion and said gripping portion can accommodate at least one other element of the same size and at the same time allow all of said elements in said intertwisted legs to maintain gripping contact with said line; and said intertwisted legs being positioned about said line such that one of said legs is unbalanced relative to said remaining leg and said grip has resistance to peeling and slippage.

10. The combination in accordance with claim 9 wherein said dead end grip includes at least three of said elements.

11. A dead end grip for gripping a line and holding it to anchoring structure, said grip having resistance to peeling and slippage upon installation and comprising a plurality of lengths of resilient elements of similar size in side-by-side relationship, said elements having an intermediate bight portion for engagement with anchoring structure whereby said elements in said portion are free of crossing over one another when engaged about anchoring structure and said bight portion is resistant to torsional twisting, an open helically preformed less than half-lay leg for gripping engagement with a line extending from each of the ends of said bight portion, each of said legs having a smaller inside diameter than the line gripped thereby, said legs, when intertwisted about the line, providing a less than whole lay gripping portion that covers more than 50% and less than 85% of the circumference of the line within said gripping portion and said gripping portion can accommodate at least one other element of the same size and at the same time allow all of the elements in the intertwisted legs to maintain gripping contact with the line.

12. A dead end grip in accordance with claim 11 wherein said grip comprises at least three of said elements which are of metal and further including, in combination, a line about which said legs are intertwisted.

13. The method of manufacturing a preformed line holding means having a straight bight portion free of a complete helical revolution for engagement with a support and helical leg portions for engagement with a line, said method comprising the steps of assembling helically preformed resilient metal elements into a set of less than a half lay with a helix of uniform pitch and diameter throughout its length, straightening the intermediate portion of the set which is to form the straight bight portion by twisting said intermediate portion under tension beyond the torsional elastic limit thereof in a direction opposite to the direction of the pitch of the helix, and then bending the set to form said holding means with said straightened portion forming the bight portion.

14. The method in accordance with claim 13 wherein the tensioning is gradually increased during said twisting operation from a low tension to a high tension.

15. The method in accordance with claim 13 wherein the elements of the set are secured to each other and the tensioning is below the elastic limit of the elements.

16. The method in accordance with claim 13 wherein said straightening is accomplished by gripping said set contiguous to the outer ends of said intermediate portion.

References Cited by the Examiner

UNITED STATES PATENTS 2,182,342    12/1939    Karitzky   ---------- 24—131 X
2,943,135    6/1960    Bertling   ---------- 57—145 X (Other references on following page)

| | | UNITED STATES PATENTS | | | FOREIGN PATENTS | |
|---|---|---|---|---|---|---|
| 3,018,319 | 1/1962 | Quayle | 174—79 | 230,965 | 1/1964 | Austria. |
| 3,032,964 | 5/1962 | Peterson | 57—142 X | 1,077,740 | 1/1957 | Germany. |
| 3,048,003 | 8/1962 | Payer. | | | | |
| 3,080,631 | 3/1963 | Ruhlman | 57—145 X | | | |
| 3,089,567 | 5/1963 | Sullivan. | | | | |
| 3,132,468 | 5/1964 | Little | 57—145 | | | |
| 3,134,842 | 5/1964 | Bethea | 174—79 | | | |
| 3,183,658 | 5/1965 | Peterson | 57—142 X | | | |

FRANK J. COHEN, *Primary Examiner.*

D. E. WATKINS, *Assistant Examiner.*